US012621066B2

(12) United States Patent　　(10) Patent No.: US 12,621,066 B2

Su et al.　　(45) Date of Patent: May 5, 2026

(54) METHOD AND APPARATUS FOR EVALUATING TRANSMISSION IMPAIRMENTS OF MULTIPLEXING CONVERTER

(71) Applicant: FUJITSU LIMITED, Kawasaki (JP)

(72) Inventors: Xiaofei Su, Beijing (CN); Tong Ye, Beijing (CN); Zhenning Tao, Beijing (CN)

(73) Assignee: 1FINITY INC., Kawasaki (JP)

( * ) Notice: Subject to any disclaimer, the term of this patent is extended or adjusted under 35 U.S.C. 154(b) by 401 days.

(21) Appl. No.: 18/378,372

(22) Filed: Oct. 10, 2023

(65) Prior Publication Data

US 2024/0129049 A1　　Apr. 18, 2024

(30) Foreign Application Priority Data

Oct. 17, 2022　(CN) .......................... 202211267247.0

(51) Int. Cl.
　*H04B 17/309*　　(2015.01)
　*H04B 10/077*　　(2013.01)
　*H04B 10/079*　　(2013.01)

(52) U.S. Cl.
　CPC ....... *H04B 17/346* (2023.05); *H04B 10/0775* (2013.01); *H04B 10/0795* (2013.01)

(58) Field of Classification Search
　CPC .............. H04B 17/346; H04B 10/0775; H04B 10/0795
　USPC ......................................... 341/141, 144, 155
　See application file for complete search history.

(56) References Cited

U.S. PATENT DOCUMENTS

| | | | | |
|---|---|---|---|---|
| 11,502,815 B2 * | 11/2022 | Faig | ..................... | H04L 7/0054 |
| 11,996,857 B2 * | 5/2024 | Lee | ................... | H03M 1/1014 |
| 2022/0066334 A1 | 3/2022 | Dastouri et al. | | |

FOREIGN PATENT DOCUMENTS

| | | |
|---|---|---|
| CN | 103701433 A | 4/2014 |
| CN | 107808170 A | 3/2018 |
| CN | 110031820 A | 7/2019 |

OTHER PUBLICATIONS

Ke Xizheng et al. "Experimental Study on Free Space Optical Orthogonal Frequency Division Multiplexing System" Chinese Journal of Lasers, vol. 42, No. 12, 9 pages; Dec. 2015.

(Continued)

*Primary Examiner* — Khai M Nguyen
(74) *Attorney, Agent, or Firm* — STAAS & HALSEY LLP

(57)　　　　ABSTRACT

A method and an apparatus for evaluating transmission impairments of a multiplexing converter. According to the method, impairments of a multiplexing converter are equivalent to the equivalent multiplicative noise and the equivalent additive noise, so as to allow evaluation of transmission impairments of the multiplexing converter, thereby to allow evaluation of the performance of a communication system. The multiplexing converter is a multiplexing analog-to-digital converter, or a multiplexing digital-to-analog converter. According to the present application, impairments of a multiplexing converter can be evaluated accurately, the performance evaluation of a communication system using the multiplexing converter is given, without being affected by an amplitude, a modulation format and a transmission rate of an input signal.

10 Claims, 8 Drawing Sheets

┌─ 101 measuring equivalent multiplicative noise and equivalent additive noise of a multiplexing converter, the multiplexing converter being a multiplexing analog-to-digital converter, or a multiplexing digital-to-analog converter

┌─ 102 using the equivalent multiplicative noise and the equivalent additive noise as transmission impairments of the multiplexing converter

(56) References Cited

OTHER PUBLICATIONS

Christian Schmidt "Interleaving Concepts for Digital-to-Analog Converters: Algorithms, Models, Simulations and Experiments" Springer Vieweg, 268 pages; 2020.

Mikael Gustavsson, et al. "CMOS data convertors for communications" Kluwer Academic Publishers, 401 pages; 2002.

Christian Schmidt et al. "Digital-to-analog Converters for High-speed Optical Communications Using Frequency Interleaving: Impairments and Characteristics," Opt. Express, vol. 26, 6758-6770, 13 pages; Mar. 19, 2018.

* cited by examiner

FIG. 1

┌─────────────────────────────────────────────────────────────┐ ⌐ 101
│ measuring equivalent multiplicative noise and equivalent additive noise of a │
│ multiplexing converter, the multiplexing converter being a multiplexing analog-to- │
│ digital converter, or a multiplexing digital-to-analog converter │
└─────────────────────────────────────────────────────────────┘

┌─────────────────────────────────────────────────────────────┐ ⌐ 102
│ using the equivalent multiplicative noise and the equivalent additive noise as │
│ transmission impairments of the multiplexing converter │
└─────────────────────────────────────────────────────────────┘

FIG. 2

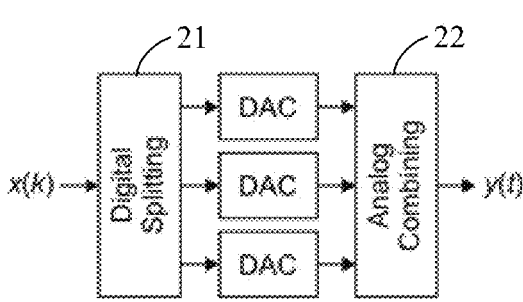

FIG. 3

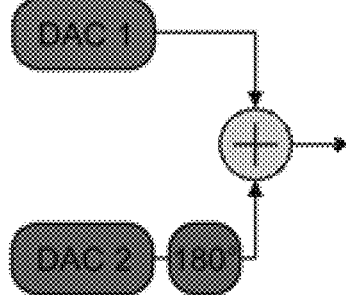

FIG. 6

601 transmitting single tone excitation signals with different amplitudes and at least one frequency, at a transmitting end

602 measuring power of the single tone excitation signals and power of total harmonic distortion and noise, at a receiving end

603 linearly fitting the power of the single tone excitation signals and the power of total harmonic distortion and noise to obtain a fitting formula

604 using an intercept of the fitting formula as a power of additive noise for measuring the equivalent additive noise and using a slope of the fitting formula as a variance of multiplicative noise for measuring the equivalent multiplicative noise

FIG. 7

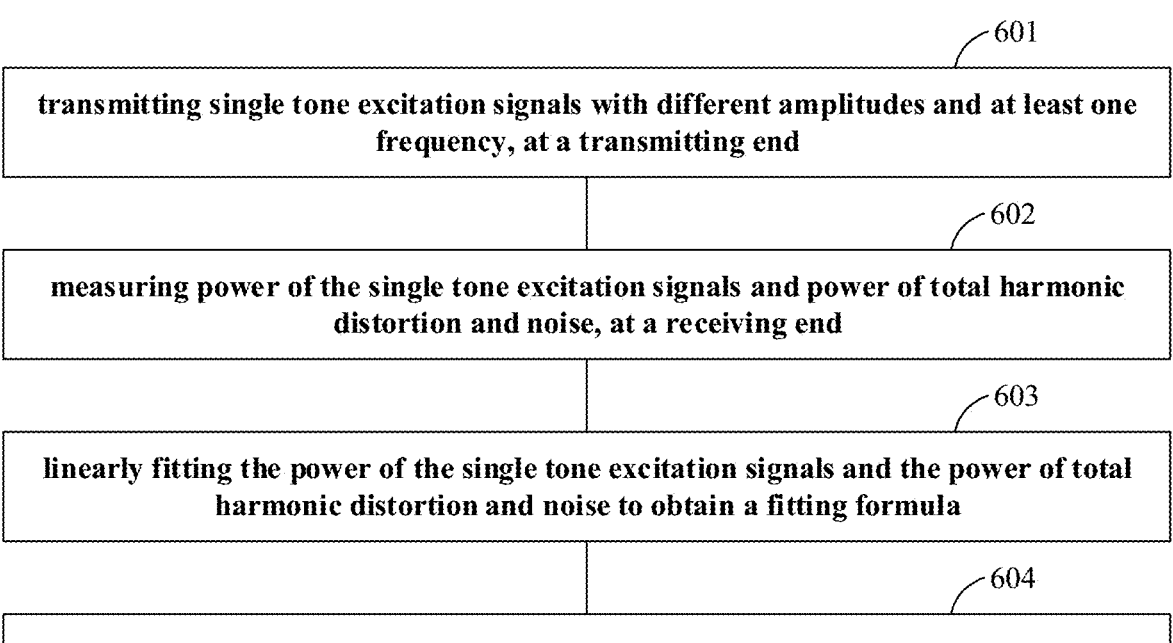

Intercept b

Linearly fitting formula

801 transmitting an all-zero excitation signal and a single tone excitation signal with a single amplitude and at least one frequency, at a transmitting end

802 measuring a power of the single tone excitation signal and a power of total harmonic distortion and noise, at a receiving end

803 using a power of the all-zero excitation signal as a power of additive noise for measuring equivalent additive noise

804 using a power obtained by subtracting the power of the all-zero excitation signal from the power of total harmonic distortion and noise and dividing by the power of the single tone excitation signal as a variance of multiplicative noise for measuring the equivalent multiplicative noise

FIG. 9

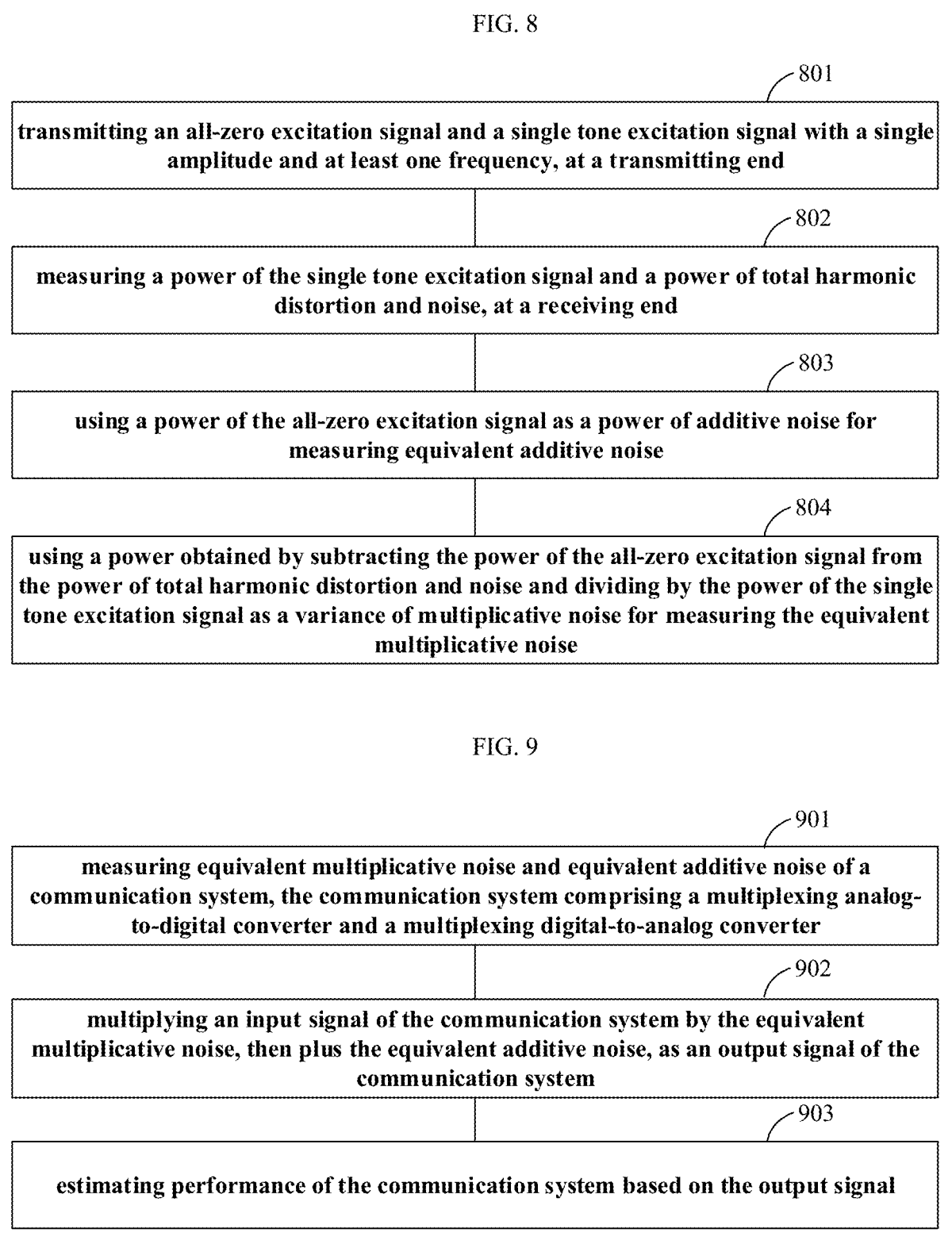

901 measuring equivalent multiplicative noise and equivalent additive noise of a communication system, the communication system comprising a multiplexing analog-to-digital converter and a multiplexing digital-to-analog converter

902 multiplying an input signal of the communication system by the equivalent multiplicative noise, then plus the equivalent additive noise, as an output signal of the communication system

903 estimating performance of the communication system based on the output signal equivalent model

1

METHOD AND APPARATUS FOR EVALUATING TRANSMISSION IMPAIRMENTS OF MULTIPLEXING CONVERTER

CROSS-REFERENCE TO RELATED APPLICATIONS

This application is based on and hereby claims priority to Chinese Application No. 202211267247.0, filed Oct. 17, 2022, in the China National Intellectual Property Administration, the disclosure of which is incorporated herein by reference.

FIELD

The present disclosure relates to the communication field, in particular to a method and an apparatus for evaluating transmission impairments of a multiplexing converter.

BACKGROUND

In modern large-capacity and ultra-high-speed optical fiber communication systems, high-speed digital-to-analog converters (DAC) and analog-to-digital converters (ADC) are indispensable devices. In order to achieve high-speed conversion between an analog signal and a digital signal, a high-speed DAC and a high-speed ADC often employ a multiplexing structure, such as time interleaving multiplexing or frequency interleaving multiplexing. A distortion mechanism of such high-speed multiplexing DAC and ADC is very complex. Since the performance of the DAC and the ADC is a fundamental limitation to a communication system, evaluating impairments of a high-speed multiplexing DAC and ADC in a communication system becomes very important.

It should be noted that the above introduction to the Background is just to facilitate a clear and complete description of the technical solution of the present disclosure, and is elaborated to facilitate the understanding of persons skilled in the art. It cannot be considered that the above technical solutions are known by persons skilled in the art just because these solutions are elaborated in the Background of the present disclosure.

SUMMARY

According to an aspect of the embodiments of the present disclosure, an apparatus for evaluating transmission impairments of a multiplexing converter is provided. The apparatus may comprise an evaluation unit, configured to measure equivalent multiplicative noise and equivalent additive noise of a multiplexing converter, the multiplexing converter being a multiplexing analog-to-digital converter, or a multiplexing digital-to-analog converter; and evaluate transmission impairments of the multiplexing converter using the equivalent multiplicative noise and the equivalent additive noise.

According to an aspect of the embodiments of the present disclosure, a communication system performance evaluation apparatus is provided. The apparatus may comprise a measurement unit, configured to measure equivalent multiplicative noise and equivalent additive noise of a communication system, the communication system comprising a multiplexing analog-to-digital converter and a multiplexing digital-to-analog converter; a calculation unit, configured to multiply an input signal of the communication system by the equivalent multiplicative noise, then plus the equivalent additive noise, as an output signal of the communication system; and an estimation unit, configured to estimate performance of the communication system based on the output signal.

The embodiments of the present disclosure have the following advantageous effects: according to the embodiments of the present disclosure, impairments of a multiplexing converter can be evaluated accurately, the performance evaluation of a communication system using the multiplexing converter is given, without being affected by an amplitude, a modulation format and a transmission rate of an input signal.

With reference to the following descriptions and drawings, the specific implementations of the present disclosure are disclosed in detail, the ways in which the principle of the present disclosure can be adopted and pointed out. It should be understood that the implementations of the present disclosure are not limited in terms of the scope. Within the scope of the terms of the appended claims, the implementations of the present disclosure include many changes, modifications and equivalents.

Features that are described and/or illustrated with respect to one implementation may be used in the same way or in a similar way in one or more other implementations and in combination with or instead of the features of the other implementations.

It should be emphasized that the term "comprise/comprising/includes/including" when being used herein specifies the presence of features, integers, steps or components, but does not preclude the presence or addition of one or more other features, integers, steps or components.

BRIEF DESCRIPTION OF THE DRAWINGS

Elements and features described in one drawing or implementation of the present embodiments of the present disclosure may be combined with elements and features shown in one or more other drawings or implementations. In addition, in the drawings, similar reference numerals represent corresponding components in several figures, and can be used to indicate corresponding components used in more than one implementations.

The included drawings are used to provide a further understanding on the embodiments of the present disclosure, constitute a part of the specification, are used to illustrate the embodiments of the present disclosure, and expound together with the text description the principle of the present disclosure. Obviously, the drawings in the following description are only some embodiments of the present disclosure. Persons skilled in the art can also obtain other drawings based on these drawings under the premise that they do not pay inventive labor.

In the drawings:

FIG. 1 is a schematic diagram of a method according to an embodiment of the present disclosure;

FIG. 2 is an architecture diagram of an example of an interleaving multiplexing DAC according to an embodiment of the present disclosure;

FIG. 3 is an architecture diagram of an example of a time interleaving multiplexing DAC according to an embodiment of the present disclosure;

FIG. 4 is an architecture diagram of another example of a time interleaving multiplexing DAC according to an embodiment of the present disclosure;

FIG. 5 is an architecture diagram of an example of a frequency multiplexing DAC according to an embodiment of the present disclosure;

FIG. 6 is a schematic diagram of measuring equivalent multiplicative noise and equivalent additive noise of a multiplexing converter according to an embodiment of the present disclosure;

FIG. 7 is a schematic diagram of linearly fitting for power of single tone excitation signals with different amplitudes and different frequencies and power of total harmonic distortion and noise according to an embodiment of the present disclosure;

FIG. 8 is a schematic diagram of measuring equivalent multiplicative noise and equivalent additive noise of a multiplexing converter according to an embodiment of the present disclosure;

FIG. 9 is a schematic diagram of a communication system performance evaluation method according to an embodiment of the present disclosure;

FIG. 10 is a schematic diagram of an equivalent system of a method according to an embodiment of the present disclosure;

FIG. 11 is a schematic diagram of a measurement result and a linear fitting result of multiple single tone signals in which an amplitude ratio includes [0, 0.5, 0.6, 0.7, 0.8, 0.9, 1] according to an embodiment of the present disclosure;

Figure 12:
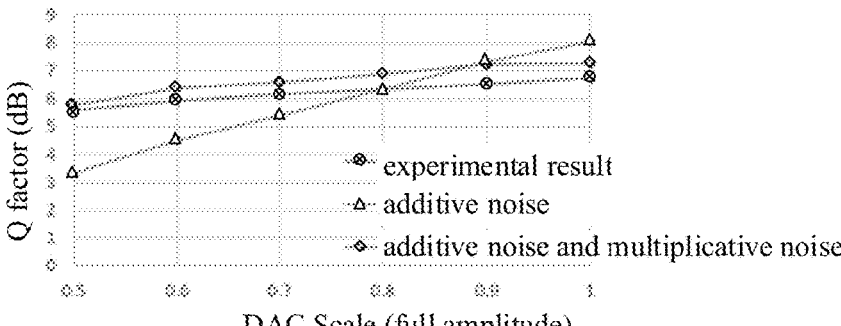
Figure 13:
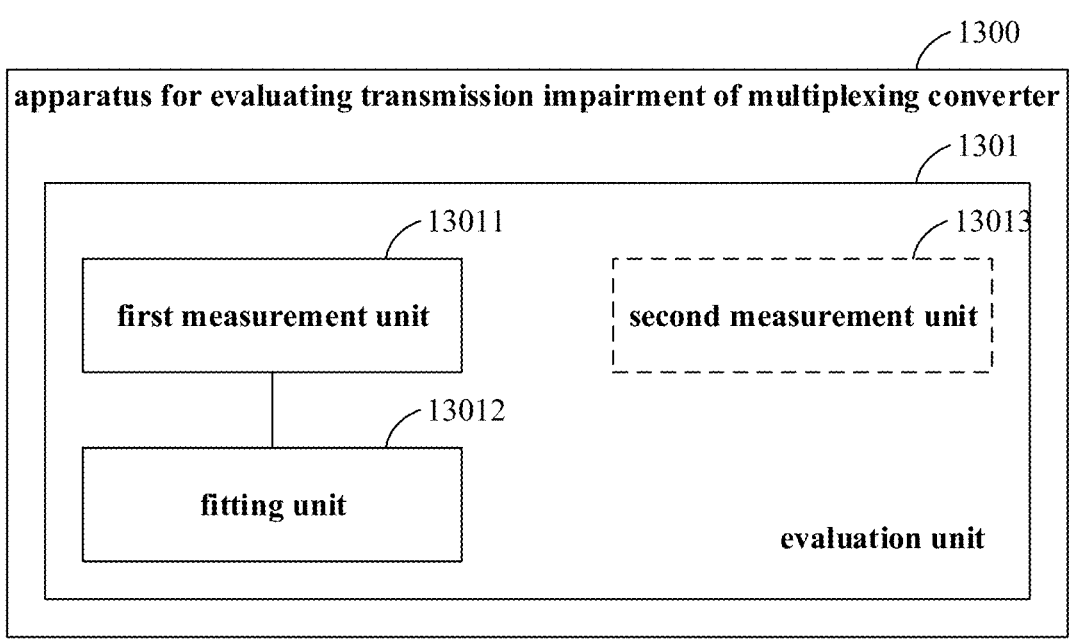
Figure 14:
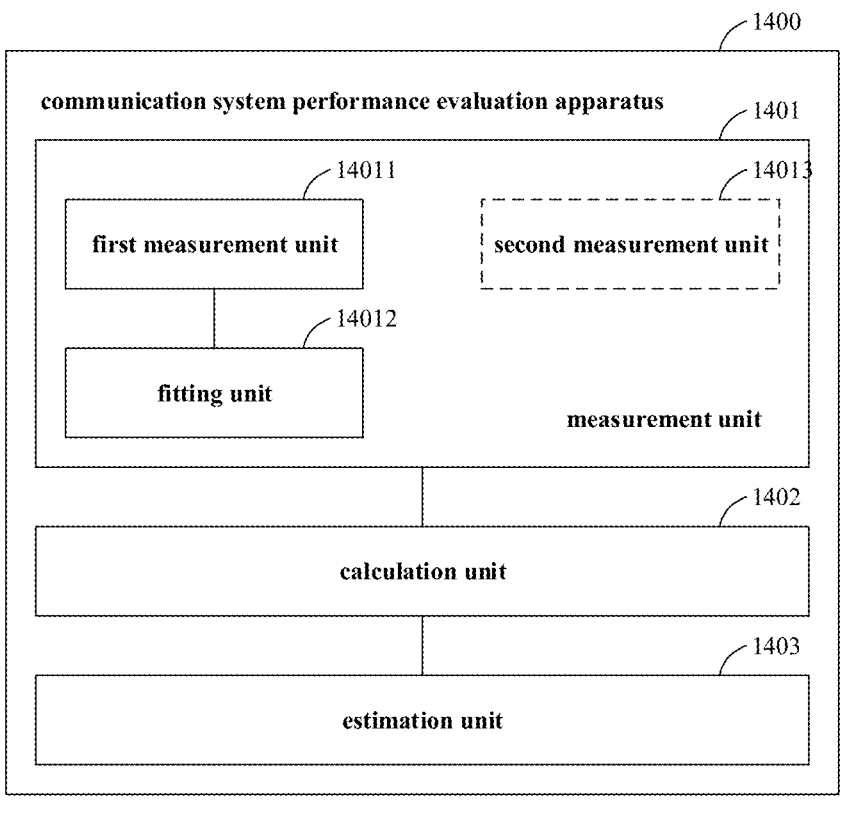
Figure 15:
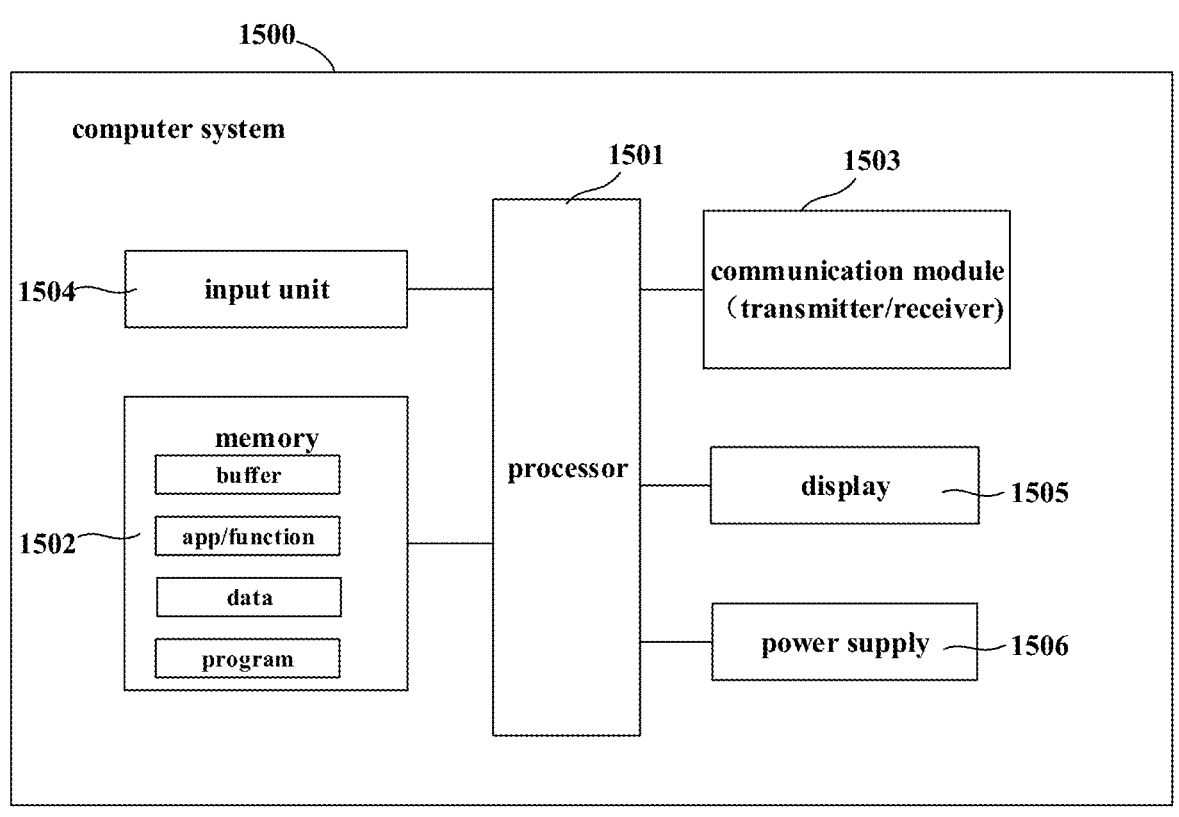

FIG. 12 is a comparison schematic diagram of a Q factor of an experimental result, a Q factor obtained by using an existing modeling mode and Q factor obtained by modeling respectively using additive and multiplicative noise according to an embodiment of the present disclosure;

FIG. 13 is a schematic diagram of an apparatus for evaluating transmission impairments of a multiplexing converter according to an embodiment of the present disclosure;

FIG. 14 is a schematic diagram of a communication system performance evaluation apparatus according to an embodiment of the present disclosure;

FIG. 15 is a schematic diagram of a computer system according to an embodiment of the present disclosure.

DETAILED DESCRIPTION

Referring to the drawings, through the following description, the above and other features of the present disclosure will become obvious. The description and the drawings specifically disclose particular implementations of the present disclosure, showing partial implementations which can adopt the principle of the present disclosure. It should be understood that the present disclosure is not limited to the described implementations, on the contrary, the present disclosure includes all the modifications, variations and equivalents falling within the scope of the appended claims.

In the embodiments of the present disclosure, the term "first" and "second", etc. are used to distinguish different elements in terms of appellation, but do not represent a spatial arrangement or time sequence, etc. of these elements, and these elements should not be limited by these terms. The term "and/or" includes any and all combinations of one or more of the associated listed terms. The terms "include", "comprise" and "have", etc. refer to the presence of stated features, elements, members or components, but do not preclude the presence or addition of one or more other features, elements, members or components.

In the embodiments of the present disclosure, the singular forms "a/an" and "the", etc. include plural forms, and should be understood broadly as "a kind of" or "a type of", rather than being limited to the meaning of "one"; in addition, the term "the" should be understood to include both the singular forms and the plural forms, unless the context clearly indicates otherwise. In addition, the term "according to" should be understood as "at least partially according to . . . ", the term "based on" should be understood as "at least partially based on . . . ", unless the context clearly indicates otherwise.

It was found by the inventor that a Signal to Noise and Distortion Ratio (SINAD) and an Effective Number of Bits (ENOB) are most widely used indicators for describing DAC and ADC impairments. A single tone signal with a fixed frequency is input into a DAC or ADC, and an output single tone signal power and power of total harmonic distortion and noise are calculated. The SINAD is a ratio of a single tone signal power to a sum of a harmonic power and a noise power, and the SINAD can be converted into ENOB directly (ENOB=(SINAD−1.76)/6.02). The ENOB and the SINAD describe noise characteristics of the DAC and the ADC when an input signal is a single tone signal. However, the input signal in actual communication is a broadband random signal. Impairments of the DAC and the ADC and the performance of the communication system cannot be estimated directly according to a value of the SINAD or ENOB.

For the above problem or other similar problems, the embodiments of the present disclosure provide a method and an apparatus for evaluating transmission impairments of a multiplexing converter.

Various implementations of the embodiments of the present disclosure will be described below with reference to the drawings.

An embodiment of the present disclosure provides a method for evaluating transmission impairments of a multiplexing converter. FIG. 1 is a schematic diagram of a method in the embodiments of the present disclosure, as shown in FIG. 1, the method comprises:

101, measuring equivalent multiplicative noise and equivalent additive noise of a multiplexing converter, the multiplexing converter being a multiplexing analog-to-digital converter, or a multiplexing digital-to-analog converter;

102, using the equivalent multiplicative noise and the equivalent additive noise as transmission impairments of the multiplexing converter.

It should be noted that the above FIG. 1 only schematically describes the method in the embodiments of the present disclosure, but the present disclosure is not limited to this. For example, other some operations can be increased or reduced. Persons skilled in the art can make appropriate modifications according to the above contents, not limited to the records in the above FIG. 1.

It was found by the inventor that a multiplexing converter is a complex system, including noise of a sub-converter per se (nonlinear noise, a DC offset, a gain error, a timing error, etc.), imbalance between sub-converters (a DC offset mismatch, a gain mismatch, a timing mismatch, etc.), and quantization noise, thermal noise and so on, which are difficult to be analyzed and processed. In the present disclosure, transmission impairments of a complex multiplexing converter are equivalent to multiplicative noise and additive noise, which can avoid complex noise analysis and directly estimate the performance of a system. With such equivalence, it is easier to estimate system performance of signals with different amplitudes and different modulation formats at different Baud rates. In addition, since measurement of additive noise and multiplicative noise does not depend on an input signal, a noise measurement result is not affected by an amplitude, a modulation format and a transmission rate of the input signal.

In the embodiments of the present disclosure, system performance can be evaluated by parameters such as an EVM (error vector magnitude), a BER (bit error rate), a Q factor, etc.

In the embodiments of the present disclosure, the above-mentioned multiplexing converter may be a multiplexing analog-to-digital converter (ADC) or a multiplexing digital-to-analog converter (DAC), such as a high-speed ADC and a high-speed DAC. In the embodiments of the present disclosure, there is no restriction on a structure of the multiplexing converter, which can be time interleaving multiplexing or can be frequency interleaving multiplexing.

FIG. 2 is an architecture diagram of an example of an interleaving multiplexing DAC, as shown in FIG. 2, the interleaving multiplexing DAC comprises a digital splitting module 21, three DACs and an analog combining module 22, with an input signal being x(k) and an output signal being y(t). In the example shown in FIG. 2, three sub-DACs are taken as an example, but the present disclosure is not limited to this, the number of sub-DACs may also be two or more than three.

Figures 4, 5:
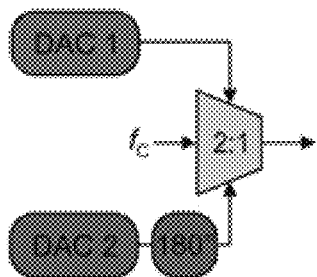

FIG. 3 is an architecture diagram of an example of a time interleaving multiplexing DAC, FIG. 4 is an architecture diagram of another example of a time interleaving multiplexing DAC, and FIG. 5 is an architecture diagram of an example of a frequency multiplexing DAC. In the examples in FIGS. 3 to 5, two sub-DACs are included respectively, other modules are also included. Reference may be made to relevant technologies for the working principle of this architecture, which shall not be repeated herein any further.

In the embodiments of the present disclosure, additive noise is independent on an amplitude of a signal, thus a level of the additive noise is measured using a power of the additive noise; moreover, multiplicative noise is dependent on an amplitude of a signal, thus a level of the multiplicative noise is measured using a variance of the multiplicative noise.

In some embodiments, equivalent multiplicative noise and equivalent additive noise of a multiplexing converter are measured based on single tone excitation signals with multiple different amplitudes.

FIG. 6 is a schematic diagram of measuring equivalent multiplicative noise and equivalent additive noise of a multiplexing converter in the present embodiment. As shown in FIG. 6, the method comprises:

601, transmitting single tone excitation signals with different amplitudes and at least one frequency, at a transmitting end;

602, measuring power of the single tone excitation signals and power of total harmonic distortion and noise, at a receiving end;

603, linearly fitting the power of the single tone excitation signals and the power of total harmonic distortion and noise to obtain a fitting formula;

604, using an intercept of the fitting formula as a power of additive noise for measuring the equivalent additive noise and using a slope of the fitting formula as a variance of multiplicative noise for measuring the equivalent multiplicative noise.

It should be noted that the above FIG. 6 only schematically describes the method in the above embodiment, but the present disclosure is not limited to this. For example, other some operations can be increased or reduced. Persons skilled in the art can make appropriate modifications according to the above contents, not limited to the records in the above FIG. 6.

In the above embodiment, first, according to an existing SINAD measurement method, a power (denoted as S) of a single tone excitation signal and a power of total harmonic distortion and noise (denoted as THD+N) of the multiplexing converter are measured under single tone excitation with different amplitudes and at least one frequency, and then the power of total harmonic distortion and noise (THD+N) and the power (denoted as S) of the single tone excitation signal are linearly fitted to obtain an intercept b and a slope a. As shown in FIG. 7, the intercept b can be used as a power of equivalent additive noise to measure equivalent additive noise, and the slope a can be used as a variance of equivalent multiplicative noise to measure equivalent multiplicative noise.

In the above embodiment, the power of the single tone excitation signal and the power of total harmonic distortion and noise may powers at one frequency, or may be average powers at multiple frequencies.

For example, for a single tone excitation signal with each amplitude, it can be transmitted at a certain frequency, and a power of the transmitted single tone excitation signal with such amplitude is measured, and the measured power is a power at such frequency. Thereby, the power S of the single tone excitation signal and the power of total harmonic distortion and noise THD+N are the power S of the single tone excitation signal and the power of total harmonic distortion and noise THD+N at such frequency.

For another example, for a single tone excitation signal with each amplitude, it can be transmitted multiple times at different frequencies, and a power of each transmitted single tone excitation signal with such amplitude is measured. Because a frequency used for each transmission is different, a power obtained from each measurement is also different. An average value of powers obtained by multiple measurements is taken as the power of the single tone excitation signal with such amplitude, thereby the power S of the single tone excitation signal and the power of total harmonic distortion and noise THD+N are an average power of powers S of the single tone excitation signal at multiple frequencies and an average power of the powers of total harmonic distortion and noise THD+N at multiple frequencies.

In the above embodiment, an average power can be obtained by performing equal weight averaging of the powers obtained by multiple measurements, or can be obtained by performing non-equal weight averaging of the powers obtained by multiple measurements, the present disclosure is not limited to this.

FIG. 7 is a schematic diagram of linearly fitting for power of single tone excitation signals with multiple different amplitudes and different frequencies and power of total harmonic distortion and noise. As shown in FIG. 7, the X axis is the power of the single tone excitation signal, and the Y axis is the power of total harmonic distortion and noise, the fitting formula $Y=a*X+b$ is obtained by linearly fitting power of single tone excitation signals with five amplitudes and the power of total harmonic distortion and noise, wherein the slope a is used as a variance of equivalent multiplicative noise to measure equivalent multiplicative noise; the intercept b is used as a power of equivalent additive noise to measure equivalent additive noise. In the example of FIG. 7, the power with each amplitude (a power of a single tone excitation signal and a power of total harmonic distortion and noise) may be an average power of measured powers at 16 equally spaced frequencies covering a signal bandwidth range, or may be a measured power at a single frequency.

In some other embodiments, equivalent multiplicative noise and equivalent additive noise of a multiplexing converter are measured based on an all-zero excitation signal and a single tone excitation signal with a single amplitude.

FIG. 8 is a schematic diagram of measuring equivalent multiplicative noise and equivalent additive noise of a multiplexing converter in the present embodiment. As shown in FIG. 8, the method comprises:

801, transmitting an all-zero excitation signal and a single tone excitation signal with a single amplitude and at least one frequency, at a transmitting end;

802, measuring a power of the single tone excitation signal and a power of total harmonic distortion and noise, at a receiving end;

803, using a power of the all-zero excitation signal as a power of additive noise for measuring equivalent additive noise;

804, using a power obtained by subtracting the power of the all-zero excitation signal from the power of total harmonic distortion and noise and dividing by the power of the single tone excitation signal as a variance of multiplicative noise for measuring the equivalent multiplicative noise.

It should be noted that the above FIG. 8 only schematically describes the method in the above embodiment, but the present disclosure is not limited to this. For example, other some operations can be increased or reduced. Persons skilled in the art can make appropriate modifications according to the above contents, not limited to the records in the above FIG. 8.

In the above embodiment, being different from the example of FIG. 6, a power of additive noise for measuring the equivalent additive noise is obtained by using a mode of all-zero signal excitation, while a variance of multiplicative noise for measuring the equivalent multiplicative noise is obtained by subtracting a power at all-zero signal excitation from a power of total harmonic distortion and noise (THD+N) at a single tone excitation with a certain amplitude and then dividing a power (S) of a single tone excitation signal.

According to the above embodiment, impairments of a multiplexing converter (an ADC or a DAC) is equivalent to equivalent multiplicative noise and equivalent additive noise, the equivalent additive noise and the equivalent multiplicative noise are obtained from a measured result of the single tone excitation signal, then the performance of an actual communication system is estimated. Since measurement of additive noise and multiplicative noise does not depend on an input signal, a noise measurement result is not affected by an amplitude, a modulation format and a transmission rate of the input signal.

The embodiments of the present disclosure further provide a communication system performance evaluation method. FIG. 9 is a schematic diagram of a communication system performance evaluation method in the embodiments of the present disclosure, as shown in FIG. 9, the method comprises:

901, measuring equivalent multiplicative noise and equivalent additive noise of a communication system, the communication system comprising a multiplexing analog-to-digital converter and a multiplexing digital-to-analog converter;

902, multiplying an input signal of the communication system by the equivalent multiplicative noise, then plus the equivalent additive noise, as an output signal of the communication system;

903, estimating performance of the communication system based on the output signal.

It should be noted that the above FIG. 9 only schematically describes the method in the embodiments of the present disclosure, but the present disclosure is not limited to this. For example, other some operations can be increased or reduced. Persons skilled in the art can make appropriate modifications according to the above contents, not limited to the records in the above FIG. 9.

It was found by the inventor that equivalent additive noise is a commonly used equivalent mode in a communication system. For example, the equivalent additive noise is used to model nonlinear noise of an optical fiber, so as to estimate performance of an optical fiber nonlinear system. The present disclosure includes an equivalent multiplicative noise module in an equivalent model, that is, the equivalent multiplicative noise and the equivalent additive noise are used to model a communication system, so that multiplicative noise associated with a signal can be included in the equivalent model.

For example, a gain mismatch and a timing mismatch between sub-DACs in a time interleaving DAC are periodic multiplicative noise associated with a signal, the multiplicative noise cannot be accurately described by a traditional additive noise model, but can be accurately described by a multiplicative noise model. By including an equivalent additive noise module and an equivalent multiplicative noise module in the equivalent model, the performance estimation of a complex communication system is more inclusive.

Figure 10:
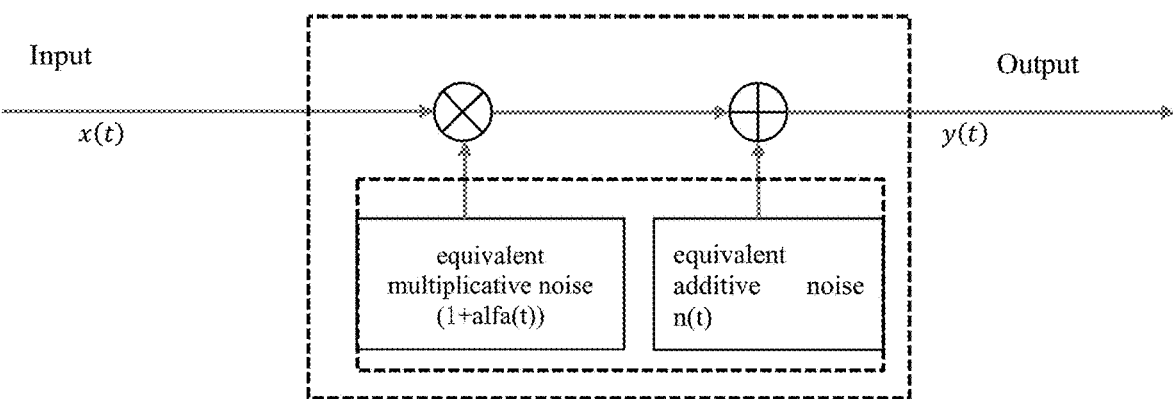

FIG. 10 is a schematic diagram of an equivalent system of a method according to the embodiments of the present disclosure, as shown in FIG. 10, an output of the equivalent system is y(t)=[1+alfa(t)]x(t)+n(t), wherein x(t) represents an input of the equivalent system, n(t) represents equivalent additive noise, and 1+alfa(t) represents equivalent multiplicative noise. In the example of FIG. 10, the input x(t) of the equivalent system has included an equivalent linear filter, that is, the input x(t) of the equivalent system is a signal that has passed through a linear filter.

In the above embodiment, a bandwidth of additive noise and multiplicative noise is equal to a bandwidth used at the time of measurement.

In the above embodiment, the equivalent additive noise n(t) is modeled as additive white Gaussian noise (AWGN) with a locked power, and alfa(t) in the equivalent multiplicative noise 1+alfa(t) is modeled as a random Gaussian distribution noise with a locked variance.

In some embodiments, the equivalent additive noise n(t) and the equivalent multiplicative noise 1+alfa(t) can be obtained through the method in FIG. 6. That is, transmitting single tone excitation signals with different amplitudes and at least one frequency at a transmitting end; measuring power of the single tone excitation signals as well as power of total harmonic distortion and noise at a receiving end; linearly fitting the power of single tone excitation signals and the power of total harmonic distortion and noise power to obtain a fitting formula; using an intercept of the fitting formula as a power of additive noise for measuring equivalent additive noise and using a slope of the fitting formula as a variance of multiplicative noise for measuring equivalent multiplicative noise.

For example, a transmitter end transmits single tone signals (sine) with different amplitudes and at least one frequency (when an amplitude of the single tone signal is 0, equating to transmission of an all-zero signal); a receiver end measures powers at a corresponding frequency(s) of the single tone signals, and power of total harmonic distortion and noise power; a power at a corresponding frequency of a single tone signal with a certain amplitude is denoted as $X(i)$, a power of total harmonic distortion and noise is denoted as $Y(i)$, i corresponds to the number of measurements that change the amplitude of the single tone signal. The above powers $X(i)$ and $Y(i)$ may respectively be powers at a certain frequency, or average powers at multiple frequencies; the averaging method may be equal-weighted averaging or may be non-equal-weighted averaging. After that, $Y(i)$ linearly fits $X(i)$, both $X(i)$ and $Y(i)$ are linear units, a fitting formula $Y(i)=a*X(i)+b$ is obtained, the intercept b is a power of additive noise, and a slope a is a variance of multiplicative noise. An additive noise model (i.e., an equivalent additive noise) uses additive white Gaussian noise (AWGN) with a locked power b, a multiplicative noise model (i.e., an equivalent multiplicative noise) uses 1+alfa (t), alfa(t) is a random Gaussian sequence with a locked variance a.

In the above embodiment, each amplitude of single tone signals with different amplitudes can be taken a value in an equally spaced manner or in a non-equally spaced manner. A measuring point participating in a linear fitting process can contain a measurement result with or without all-zero inputs. Linear fitting can be either forced zero crossing fitting or non-zero crossing fitting.

Figure 11:
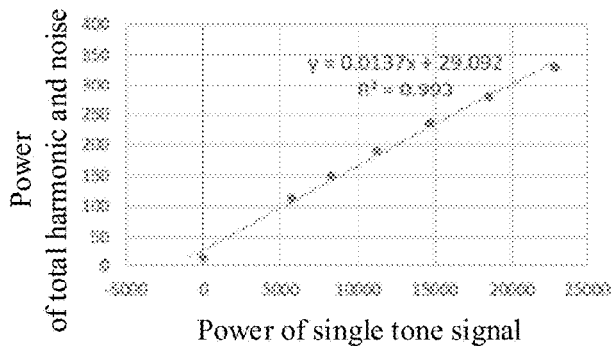

FIG. 11 is a schematic diagram of a measurement result and a linear fitting result of multiple single tone signals in which an amplitude ratio includes [0, 0.5, 0.6, 0.7, 0.8, 0.9, 1]. As shown in FIG. 11, an actually measured 12G Sample/s PAM8 signal is modeled according to the method in the embodiments of the present disclosure, the equivalent multiplicative noise is 1+alfa(t), alfa(t) adopts a random Gaussian sequence with a locked variance being 0.0137, and equivalent additive noise adopts additive white Gaussian noise with a locked power being 29.092.

FIG. 12 is a comparison schematic diagram of a Q factor of an experimental result, a Q factor obtained by using an existing modeling mode and a Q factor obtained by modeling respectively using additive noise and multiplicative noise. As can be seen from FIG. 12, the Q factor obtained by the method proposed in the embodiments of the present disclosure (i.e. using additive noise and multiplicative noise modeling) is closer to an experimental result, hence according to the method in the embodiments of the present disclosure, system performance can be estimated more accurately.

In some other embodiments, the equivalent additive noise n(t) and the equivalent multiplicative noise 1+alfa(t) can be obtained through the method in FIG. 8. That is, transmitting an all-zero excitation signal and a single tone excitation signal(s) with a single amplitude and at least one frequency at a transmitting end; measuring a power of the single tone excitation signal and a power of total harmonic distortion and noise at a receiving end; using a power of an all-zero excitation signal as a power of additive noise for measuring the equivalent additive noise, and using a power obtained by subtracting the power of the all-zero excitation signal from the power of total harmonic distortion and noise and dividing by the power of the single tone excitation signal as a variance of multiplicative noise for measuring the equivalent multiplicative noise. For details, the description of FIG. 8 may be referred to, which is not detailed here.

In the embodiments of the present disclosure, the communication system comprises a multiplexing converter, such as a multiplexing ADC and a multiplexing DAC. The multiplexing ADC and the multiplexing DAC have been described above, and will not be repeated here. In addition, the communication system may also comprise other devices.

In the above each embodiment, by taking "the equivalent additive noise n(t) is modeled as additive white Gaussian noise (AWGN) with a locked power, and alfa(t) in the equivalent multiplicative noise 1+alfa(t) is modeled as a random Gaussian distribution noise with a locked variance" as an example, but the present application is not limited to this, the equivalent additive noise n(t) and the alfa(t) in the equivalent multiplicative noise 1+alfa(t) may also be modeled as noise or sequences of other distributions, such as uniform distribution, chi square distribution and so on.

In the above each embodiment, by taking "the input of the communication system is an input signal that has passed through a linear filter" as an example, but the present application is not limited to this, in addition to passing through the linear filter, the input signal may also pass through other devices of the communication system or digital signal processing, such as clock recovery, frame synchronization, and so on.

In the above each embodiment, by taking "multiplying an input of the communication system by the equivalent multiplicative noise then plus the equivalent additive noise, as an output signal of the communication system" as an example, but the present application is not limited to this, it can also be: an input of the communication system plus the equivalent additive noise, then multiplied by the equivalent multiplicative noise, as an output of the communication system. Moreover, other forms of noise models may also be added in the equivalent model in FIG. 10, as long as the equivalent model contains equivalent multiplicative noise and equivalent additive noise, both are included within the scope of the present disclosure.

Each of the above embodiments is only illustrative for the embodiments of the present disclosure, but the present disclosure is not limited to this, appropriate modifications can be also made based on the above each embodiment. For example, each of the above embodiments may be used individually, or one or more of the above embodiments may be combined.

According to the method in the embodiments of the present disclosure, impairments of a multiplexing converter can be evaluated accurately, the performance evaluation of a communication system using the multiplexing converter is given, without being affected by an amplitude, a modulation format and a transmission rate of an input signal.

The embodiments of the present disclosure provide an apparatus for evaluating transmission impairments of a multiplexing converter. An implementation principle of the apparatus is similar to the method for evaluating transmission impairments of a multiplexing converter in the embodiments of the first aspect. The contents same as those in the embodiments of the first aspect will not be described repeatedly.

FIG. 13 is a schematic diagram of an apparatus for evaluating transmission impairments of a multiplexing converter in the embodiments of the present disclosure, as shown in FIG. 13, an apparatus 1300 comprises:

an evaluation unit 1301, configured to measure equivalent multiplicative noise and equivalent additive noise of a multiplexing converter, the multiplexing converter being a multiplexing analog-to-digital converter, or a multiplexing digital-to-analog converter; and the equivalent multiplicative noise and the equivalent additive noise being used as transmission impairments of the multiplexing converter.

In some embodiments, as shown in FIG. 13, the evaluation unit 1301 comprises:

a first measurement unit 13011, configured to measure at a receiving end a power of single tone excitation signals with different amplitudes and at least one frequency, transmitted by a transmitting end, as well as a power of total harmonic distortion and noise; and a fitting unit 13012, configured to linearly fit the power of the single tone excitation signal and the power of total harmonic distortion and noise to obtain a fitting formula, and an intercept of the fitting formula being used as a power of additive noise for measuring the equivalent additive noise and a slope of the fitting formula being used as a variance of multiplicative noise for measuring the equivalent multiplicative noise.

In the above embodiment, the power of the single tone excitation signal and the power of total harmonic distortion and noise may be respectively a power measured at one frequency, or an average power measured at multiple single tone excitation signals with different frequencies.

In the above embodiment, the average power may be obtained by equal-weighted or non-equal-weighted averaging of powers measured at the multiple single tone excitation signals with different frequencies.

In some other embodiments, as shown in FIG. 13, the evaluation unit 1302 comprises:

a second measurement unit 13013, configured to measure at the receiving end a power of a single tone excitation signal with a single amplitude and at least one frequency, transmitted by a transmitting end, as well as a power of total harmonic distortion and noise, a power of an all-zero excitation signal transmitted by the transmitting end being used as a power of additive noise for measuring the equivalent additive noise, and a power obtained by subtracting the power of the all-zero excitation signal from the power of total harmonic distortion and noise and dividing by the power of the single tone excitation signal being used as a variance of multiplicative noise for measuring the equivalent multiplicative noise.

The embodiments of the present disclosure provide a communication system performance evaluation apparatus. An implementation principle of the apparatus is similar to the communication system performance evaluation method in the embodiments of the first aspect. The contents same as those in the embodiments of the first aspect will not be described repeatedly.

FIG. 14 is a schematic diagram of a communication system performance evaluation apparatus in the embodiments of the present disclosure, as shown in FIG. 14, the apparatus 1400 comprises:

a measurement unit 1401, configured to measure equivalent multiplicative noise and equivalent additive noise of a communication system, the communication system comprising a multiplexing analog-to-digital converter and a multiplexing digital-to-analog converter;

a calculation unit 1402, configured to multiply an input signal of the communication system by the equivalent multiplicative noise, then plus the equivalent additive noise, as an output signal of the communication system; and an estimation unit 1403, configured to estimate performance of the communication system based on the output signal.

In some embodiment, the input signal of the communication system is a signal that has passed through a linear filter.

In some embodiment, the equivalent additive noise is additive white Gaussian noise with a locked power; the equivalent multiplicative noise is a random Gaussian distribution noise with a locked variance.

In some embodiments, as shown in FIG. 14, the measurement unit 1401 comprises:

a first measurement unit 14011, configured to measure at a receiving end a power of single tone excitation signals with different amplitudes and at least one frequency, transmitted by a transmitting end, as well as a power of total harmonic distortion and noise;

a fitting unit 14012, configured to linearly fit the power of the single tone excitation signal and the power of total harmonic distortion and noise to obtain a fitting formula, an intercept of the fitting formula being used as a power of additive noise for measuring the equivalent additive noise and a slope of the fitting formula being used as a variance of multiplicative noise for measuring the equivalent multiplicative noise.

In the above embodiment, the power of the single tone excitation signal and the power of total harmonic distortion and noise may be respectively a power measured at one frequency, or an average power measured at multiple single tone excitation signals with different frequencies.

In the above embodiment, the average power may be obtained by equal-weighted or non-equal-weighted averaging of powers measured at the multiple single tone excitation signals with different frequencies.

In some other embodiments, as shown in FIG. 14, the measurement unit 1401 comprises:

a second measurement unit 14013, configured to measure at the receiving end a power of a single tone excitation signal with a single amplitude and at least one frequency, transmitted by a transmitting end, as well as a power of total harmonic distortion and noise, a power of an all-zero excitation signal transmitted by the transmitting end being used as a power of additive noise for measuring the equivalent additive noise, and a power obtained by subtracting the power of the all-zero excitation signal from the power of total harmonic distortion and noise and dividing by the power of the single tone excitation signal being used as a variance of multiplicative noise for measuring the equivalent multiplicative noise.

In the above embodiment, the communication system comprises a multiplexing converter comprising a multiplexing ADC and a multiplexing DAC.

According to the apparatus in the embodiments of the present disclosure, impairments of a multiplexing converter can be evaluated accurately, the performance of a communication system using the multiplexing converter is given, without being affected by an amplitude, a modulation format and a transmission rate of an input signal.

The embodiments of the present disclosure provide a computer system. The computer system may be configured at a receiving end of a communication system, or in a cloud, or in any other implementable position.

FIG. 15 is a schematic diagram of a computer system in the embodiments of the present disclosure, as shown in FIG. 15, the computer system 1500 may comprise: a processor 1501 and a memory 1502; the memory 1502 is coupled to the processor 1501. The memory 1502 may store various data; moreover, also stores a program for information processing, and executes the program under the control of the processor 1501.

In some embodiments, functions of the apparatus 1300 or 1400 in the embodiments of the second aspect may be integrated into the processor 1501, wherein the processor 1501 may be configured to execute a program to implement the method as described in the embodiments of the first aspect, the contents of which are incorporated herein and are not described repeatedly here.

In some other embodiments, the apparatus 1300 or 1400 in the embodiments of the second aspect may be configured separately from the processor 1501, for example the apparatus 1300 or 1400 in the embodiments of the second aspect may be configured as a chip connected to the processor 1501, functions of the apparatus 1300 or 1400 in the embodiments of the second aspect are realized through the control of the processor 1501.

As shown in FIG. 15, the computer system 1500 may further comprise: a communication module 1503, an input unit 1504, a display 1505 and a power source 1506. The functions of said components are similar to related arts, which are not repeated here. It's worth noting that the computer system 1500 does not have to include all the components shown in FIG. 15, said components are not indispensable. Moreover, the computer system 1500 may also include components not shown in FIG. 15, relevant technologies can be referred to.

The embodiments of the present disclosure further provide a computer readable program, wherein when an apparatus for evaluating transmission impairments of a multiplexing converter executes the program, the program enables the apparatus to perform the method for evaluating transmission impairments of a multiplexing converter as described in the embodiments of the first aspect.

The embodiments of the present disclosure further provide a storage medium storing a computer readable program, wherein the computer readable program enables an apparatus for evaluating transmission impairments of a multiplexing converter to perform the method for evaluating transmission impairments of a multiplexing converter as described in the embodiments of the first aspect.

The embodiments of the present disclosure further provide a computer readable program, wherein when a communication system performance evaluation apparatus executes the program, the program enables the apparatus to perform the communication system performance evaluation method described in the embodiments of the first aspect.

The embodiments of the present disclosure provide a storage medium storing a computer readable program, wherein the computer readable program enables a communication system performance evaluation apparatus to perform the communication system performance evaluation method described in the embodiments of the first aspect.

The apparatus and method in the present disclosure can be realized by hardware, or can be realized by combining hardware with software. The present disclosure relates to such a computer readable program, when the program is executed by a logic component, the computer readable program enables the logic component to realize the apparatus described in the above text or a constituent component, or enables the logic component to realize various methods or steps described in the above text. The logic component is e.g. a field programmable logic component, a microprocessor, a processor used in a computer, etc. The present disclosure also relates to a storage medium storing the program, such as a hard disk, a magnetic disk, an optical disk, a DVD, a flash memory, etc.

By combining with the method/apparatus described in the embodiments of the present disclosure, it can be directly reflected as hardware, a software executed by a processor, or a combination thereof. For example, one or more of the functional block diagrams and/or one or more combinations of the functional block diagrams as shown in the drawings may correspond to software modules of a computer program flow, and may also correspond to hardware modules. These software modules may respectively correspond to the steps as shown in the drawings. These hardware modules can be realized by solidifying these software modules e.g. using a field-programmable gate array (FPGA).

The software module can be located in a RAM memory, a flash memory, a ROM memory, an EPROM memory, an EEPROM memory, a register, a hard disk, a removable magnetic disk, a CD-ROM or a storage medium in any other form as known in this field. A storage medium may be coupled to a processor, thereby the processor can read information from the storage medium, and write the information into the storage medium; or the storage medium may be a constituent part of the processor. The processor and the storage medium may be located in an ASIC. The software module may be stored in a memory of a mobile terminal, and may also be stored in a memory card of the mobile terminal. For example, if a device (such as the mobile terminal) adopts a MEGA-SIM card with a larger capacity or a flash memory apparatus with a large capacity, the software module can be stored in the MEGA-SIM card or the flash memory apparatus with a large capacity.

One or more of the functional block diagrams and/or one or more combinations in the functional block diagrams as described in the drawings may be implemented as a general-purpose processor for performing the functions described in the present disclosure, a digital signal processor (DSP), an application-specific integrated circuit (ASIC), a field-programmable gate array (FPGA) or any other programmable logic device, discrete gate or transistor logic device, discrete hardware components or any combination thereof. One or more of the functional block diagrams and/or one or more combinations of the functional block diagrams as described in the drawings may be also implemented as a combination of computer equipment(s), such as a combination of a DSP and a microprocessor, a plurality of microprocessors, one or more microprocessors combined and communicating with the DSP or any other such configuration.

The present disclosure has been described herein above with reference to the specific embodiments, however persons skilled in the art should understand that these descriptions are exemplary rather than limiting the protection scope of the present disclosure. Persons skilled in the art can make various variations and modifications to the present disclosure based on the principle of the present disclosure, these variations and modifications are also within the scope of the present disclosure.

As for the implementations including the above multiple embodiments, the following supplements are further disclosed.

1. A method for evaluating transmission impairments of a multiplexing converter, comprising:

measuring equivalent multiplicative noise and equivalent additive noise of a multiplexing converter;

using the equivalent multiplicative noise and the equivalent additive noise as transmission impairments of the multiplexing converter.

2. The method according to the supplement 1, wherein measuring equivalent multiplicative noise and equivalent additive noise of a multiplexing converter comprises:

transmitting single tone excitation signals with different amplitudes and at least one frequency, at a transmitting end;

measuring a power of the single tone excitation signal and a power of total harmonic distortion and noise, at a receiving end;

linearly fitting the power of the single tone excitation signal and the power of total harmonic distortion and noise to obtain a fitting formula; and using an intercept of the fitting formula as a power of additive noise for measuring the equivalent additive noise and using a slope of the fitting formula as a variance of multiplicative noise for measuring the equivalent multiplicative noise.

3. The method according to the supplement 1, wherein measuring equivalent multiplicative noise and equivalent additive noise of a multiplexing converter comprises:

transmitting an all-zero excitation signal and a single tone excitation signal with a single amplitude and at least one frequency, at a transmitting end;

measuring a power of the single tone excitation signal and a power of total harmonic distortion and noise, at a receiving end;

using a power of the all-zero excitation signal as a power for measuring equivalent additive noise; and using a power obtained by subtracting the power of the all-zero excitation signal from the power of total harmonic distortion and noise and dividing by the power of the single tone excitation signal as a variance for measuring the equivalent multiplicative noise.

4. The method according to the supplement 2, wherein the power of the single tone excitation signal and the power of total harmonic distortion and noise are respectively a power measured at one frequency, or an average power measured at multiple single tone excitation signals with different frequencies.

5. The method according to the supplement 4, wherein the average power is obtained by equal-weighted or non-equal-weighted averaging of powers measured at the multiple single tone excitation signals with different frequencies.

6. The method according to any one of the supplements 1 to 5, wherein the multiplexing converter is a multiplexing analog-to-digital converter, or a multiplexing digital-to-analog converter.

7. A communication system performance evaluation method, wherein the method comprises:

measuring equivalent multiplicative noise and equivalent additive noise of a communication system;

multiplying an input signal of the communication system by the equivalent multiplicative noise, then plus the equivalent additive noise, as an output signal of the communication system; and estimating performance of the communication system based on the output signal.

8. The method according to the supplement 7, wherein the input signal of the communication system is a signal that has passed through a linear filter.

9. The method according to the supplement 7, wherein the equivalent additive noise is additive white Gaussian noise with a locked power.

10. The method according to the supplement 7, wherein the equivalent multiplicative noise is a random Gaussian distribution noise with a locked variance.

11. The method according to the supplement 7, wherein measuring equivalent multiplicative noise and equivalent additive noise of a communication system comprises:

transmitting single tone excitation signals with different amplitudes and at least one frequency, at a transmitting end;

measuring a power of the single tone excitation signal and a power of total harmonic distortion and noise, at a receiving end;

linearly fitting the power of the single tone excitation signal and the power of total harmonic distortion and noise to obtain a fitting formula; and using an intercept of the fitting formula as a power of additive noise for measuring the equivalent additive noise and using a slope of the fitting formula as a variance of multiplicative noise for measuring the equivalent multiplicative noise.

12. The method according to the supplement 7, wherein measuring equivalent multiplicative noise and equivalent additive noise of a communication system comprises:

transmitting an all-zero excitation signal and a single tone excitation signal with a single amplitude and at least one frequency, at a transmitting end;

measuring a power of the single tone excitation signal and a power of total harmonic distortion and noise, at a receiving end;

using a power of the all-zero excitation signal as a power of additive noise for measuring equivalent additive noise; and using a power obtained by subtracting the power of the all-zero excitation signal from the power of total harmonic distortion and noise and dividing by the power of the single tone excitation signal as a variance of multiplicative noise for measuring the equivalent multiplicative noise.

13. The method according to the supplement 11, wherein the power of the single tone excitation signal and the power of total harmonic distortion and noise are respectively a power measured at one frequency, or an average power measured at multiple single tone excitation signals with different frequencies.

14. The method according to the supplement 13, wherein the average power is obtained by equal-weighted or non-equal-weighted averaging of powers measured at the multiple single tone excitation signals with different frequencies.

15. The method according to any one of the supplements 7 to 14, wherein the communication system comprises a multiplexing digital-to-analog converter and a multiplexing analog-to-digital converter.

16. A computer system, comprising a memory and a processor, the memory storing a computer program, and the processor being configured to execute the method according to any one of the supplements 1 to 15.

What is claimed is:

1. An apparatus for evaluating transmission impairments of a multiplexing converter, the apparatus comprising:

an evaluation unit configured to:

measure equivalent multiplicative noise and equivalent additive noise of a multiplexing converter, the multiplexing converter being a multiplexing analog-to-digital converter, or a multiplexing digital-to-analog converter; and evaluate transmission impairments of the multiplexing converter using the equivalent multiplicative noise and the equivalent additive noise.

2. The apparatus according to claim 1, wherein the evaluation unit comprises:

a measurement unit, configured to measure, at a receiving end, a power of single tone excitation signals with different amplitudes and at least one frequency, transmitted by a transmitting end, and a power of total harmonic distortion and noise; and a fitting unit, configured to linearly fit the power of the single tone excitation signals and the power of total harmonic distortion and noise to obtain a fitting formula, and an intercept of the fitting formula being used as a power of additive noise for measuring the equivalent additive noise and a slope of the fitting formula being used as a variance of multiplicative noise for measuring the equivalent multiplicative noise.

3. The apparatus according to claim 1, wherein the evaluation unit comprises:

a measurement unit, configured to measure, at a receiving end, a power of a single tone excitation signal with a single amplitude and at least one frequency, transmitted by a transmitting end, a power of total harmonic distortion and noise, a power of an all-zero excitation signal transmitted by the transmitting end being used as a power of additive noise for measuring the equivalent additive noise, and a power obtained by subtracting the power of the all-zero excitation signal from the power of total harmonic distortion and noise and dividing by the power of the single tone excitation signal being used as a variance of multiplicative noise for measuring the equivalent multiplicative noise.

4. The apparatus according to claim 2, wherein, the power of the single tone excitation signals and the power of total harmonic distortion and noise are respectively a power measured at one frequency, or an average power measured at multiple single tone excitation signals with different frequencies; and the average power is obtained by equal-weighted or non-equal-weighted averaging of powers measured at the multiple single tone excitation signals with different frequencies.

5. An apparatus for communication system performance, the apparatus, the apparatus comprising:

a measurement unit, configured to measure equivalent multiplicative noise and equivalent additive noise of a communication system, the communication system comprising a multiplexing analog-to-digital converter and a multiplexing digital-to-analog converter;

a calculation unit, configured to multiply an input signal of the communication system by the equivalent multiplicative noise, then plus the equivalent additive noise, as an output signal of the communication system; and an estimation unit, configured to estimate performance of the communication system based on the output signal.

6. The apparatus according to claim 5, wherein the input signal of the communication system is a signal that has passed through a linear filter.

7. The apparatus according to claim 5, wherein the equivalent additive noise is additive white Gaussian noise with a locked power; and the equivalent multiplicative noise is a random Gaussian distribution noise with a locked variance.

8. The apparatus according to claim 5, wherein the measurement unit is configured to measure, at a receiving end, a power of single tone excitation signals with different amplitudes and at least one frequency, transmitted by a transmitting end, and a power of total harmonic distortion and noise;

wherein the measurement unit comprises:

a fitting unit, configured to linearly fit the power of the single tone excitation signals and the power of total harmonic distortion and noise to obtain a fitting formula, an intercept of the fitting formula being used as a power of additive noise for measuring the equivalent additive noise and a slope of the fitting formula being used as a variance of multiplicative noise for measuring the equivalent multiplicative noise.

9. The apparatus according to claim 5, wherein the measurement unit is configured to measure, at a receiving end, a power of a single tone excitation signal with a single amplitude and at least one frequency, transmitted by a transmitting end, a power of total harmonic distortion and noise, a power of an all-zero excitation signal transmitted by the transmitting end being used as a power of additive noise for measuring the equivalent additive noise, and a power obtained by subtracting the power of the all-zero excitation signal from the power of total harmonic distortion and noise and dividing by the power of the single tone excitation signal being used as a variance of multiplicative noise for measuring the equivalent multiplicative noise.

10. The apparatus according to claim 8, wherein the power of the single tone excitation signal and the power of total harmonic distortion and noise are respectively a power measured at one frequency, or an average power measured at multiple single tone excitation signals with different frequencies; and the average power is obtained by equal-weighted or non-equal-weighted averaging of powers measured at the multiple single tone excitation signals with different frequencies.

* * * * *